United States Patent
Ohashi

(10) Patent No.: US 8,957,876 B2
(45) Date of Patent: Feb. 17, 2015

(54) INFORMATION PROCESSING APPARATUS AND COMPUTER-READABLE STORAGE MEDIUM

(75) Inventor: Jun Ohashi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 445 days.

(21) Appl. No.: 13/311,457

(22) Filed: Dec. 5, 2011

(65) Prior Publication Data

US 2012/0218227 A1    Aug. 30, 2012

(30) Foreign Application Priority Data

Feb. 28, 2011    (JP) ................. 2011-042623

(51) Int. Cl.
*G06F 3/042*  (2006.01)
*G06F 3/0488* (2013.01)
*G06F 3/03*   (2006.01)

(52) U.S. Cl.
CPC .......... *G06F 3/04883* (2013.01); *G06F 3/0304* (2013.01); *G06F 2203/04104* (2013.01)
USPC ....................................................... 345/175

(58) Field of Classification Search
None
See application file for complete search history.

(56) References Cited

U.S. PATENT DOCUMENTS

| | | | |
|---|---|---|---|
| 6,421,042 B1 | 7/2002 | Omura et al. | |
| 6,567,078 B2 | 5/2003 | Ogawa | |
| 8,144,127 B2 | 3/2012 | Shimasaki et al. | |
| 8,237,818 B2 * | 8/2012 | Kato | 348/239 |
| 2001/0050669 A1 | 12/2001 | Ogawa | |
| 2006/0061557 A1 * | 3/2006 | Kyrola | 345/173 |

FOREIGN PATENT DOCUMENTS

| | | |
|---|---|---|
| JP | 11-144024 A | 5/1999 |
| JP | 2000-132340 A | 5/2000 |
| JP | 2001-209487 A | 8/2001 |
| JP | 2001-318759 | 11/2001 |
| JP | 2003-122505 A | 4/2003 |
| JP | 2007-323660 | 12/2007 |

(Continued)

OTHER PUBLICATIONS

First Office Action mailed by Japan Patent Office on May 28, 2013 in the corresponding Japanese Patent Application 2012-126266—7 pages.

(Continued)

*Primary Examiner* — Joseph Haley
*Assistant Examiner* — Parul Gupta
(74) *Attorney, Agent, or Firm* — Knobbe, Martens, Olson & Bear LLP

(57) ABSTRACT

According to one embodiment, an information processing apparatus includes a display with a touch panel, a camera and an image recognition module. The image recognition module recognizes a type of an object used for inputting to the touch panel in an image acquired by the camera. The image recognition module comprises a first narrowing module and a second narrowing module. The first narrowing module extracts an image to be used for recognizing the type of the object from acquired images based on timing information indicating timing of the inputting. The second narrowing module selects a recognition range to be used for recognizing the type of the object from a photographing region of the extracted image based on positional information indicating an input position on the touch panel. The timing information and the positional information is included in the input information obtained from the touch panel.

6 Claims, 12 Drawing Sheets

(56) References Cited

FOREIGN PATENT DOCUMENTS

| | | |
|---|---|---|
| JP | 2009-037464 | 2/2009 |
| JP | 2009-193323 A | 8/2009 |

OTHER PUBLICATIONS

First Office Action mailed by Japan Patent Office on Feb. 14, 2012 in the corresponding Japanese patent application No. 2011-042623.

* cited by examiner

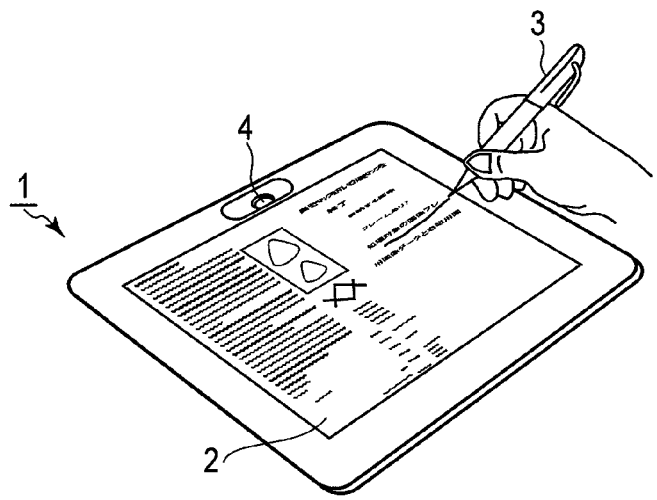
F I G. 1
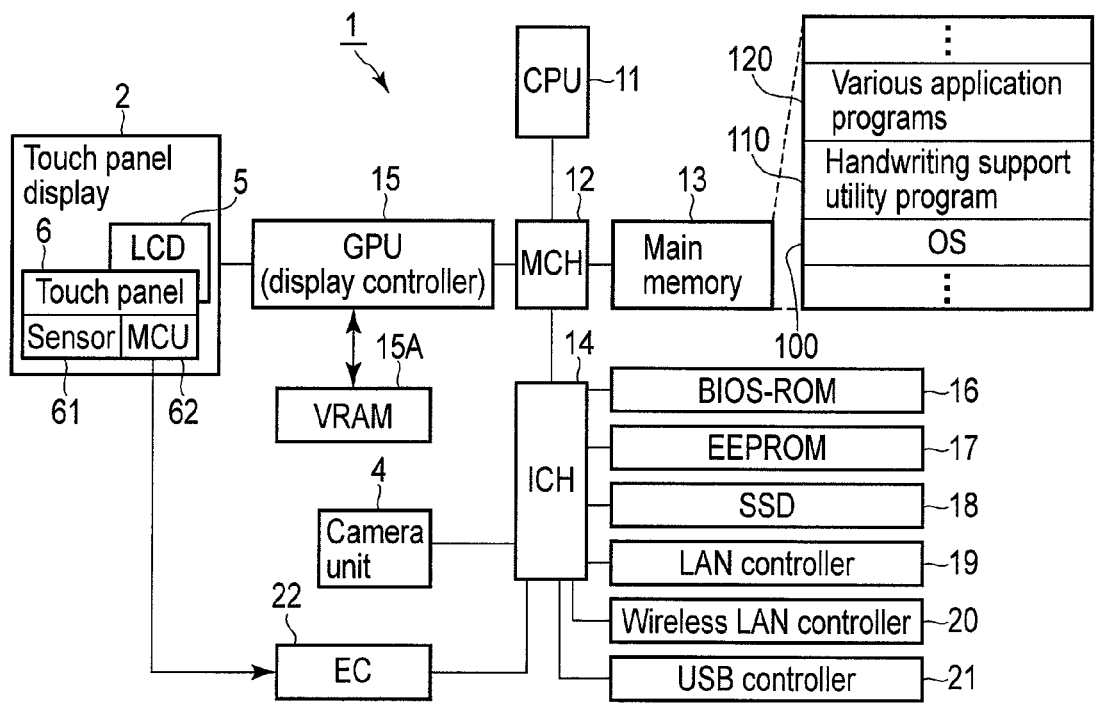
F I G. 2

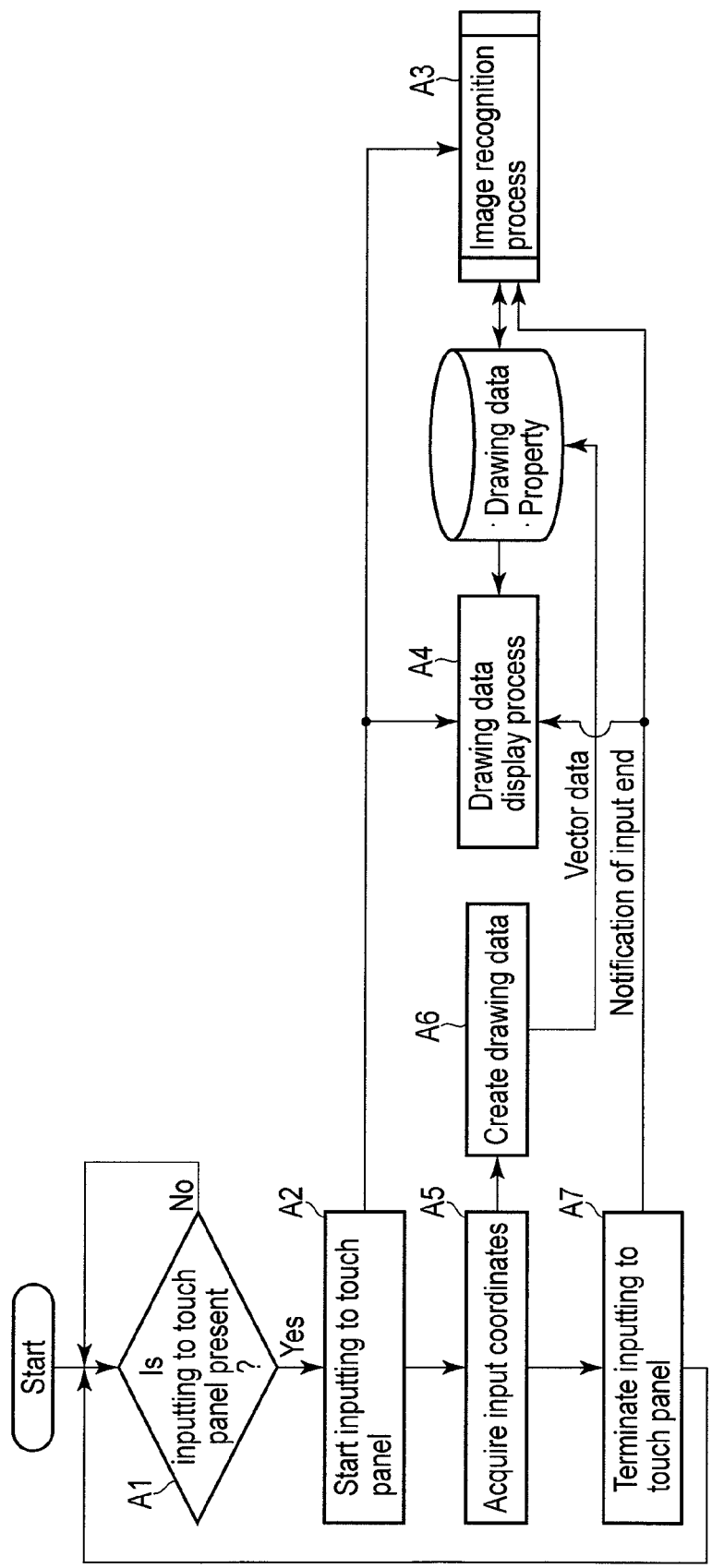
F I G. 4

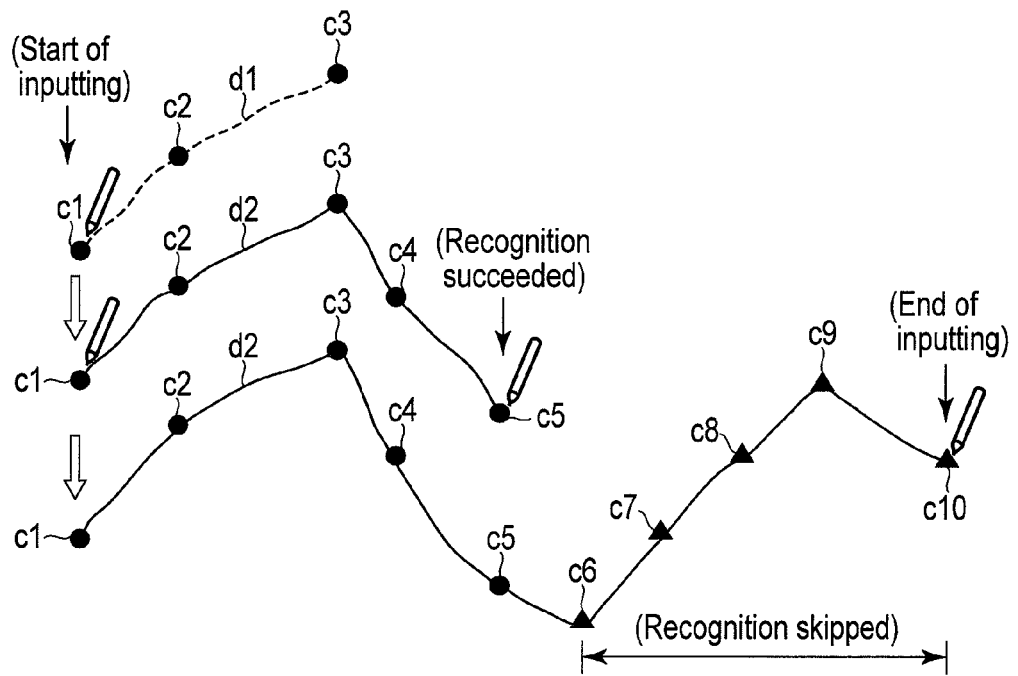
F I G. 6
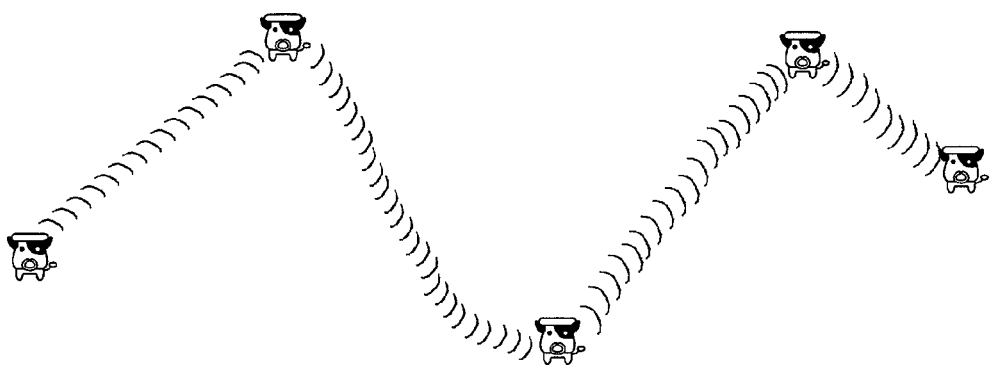
F I G. 7

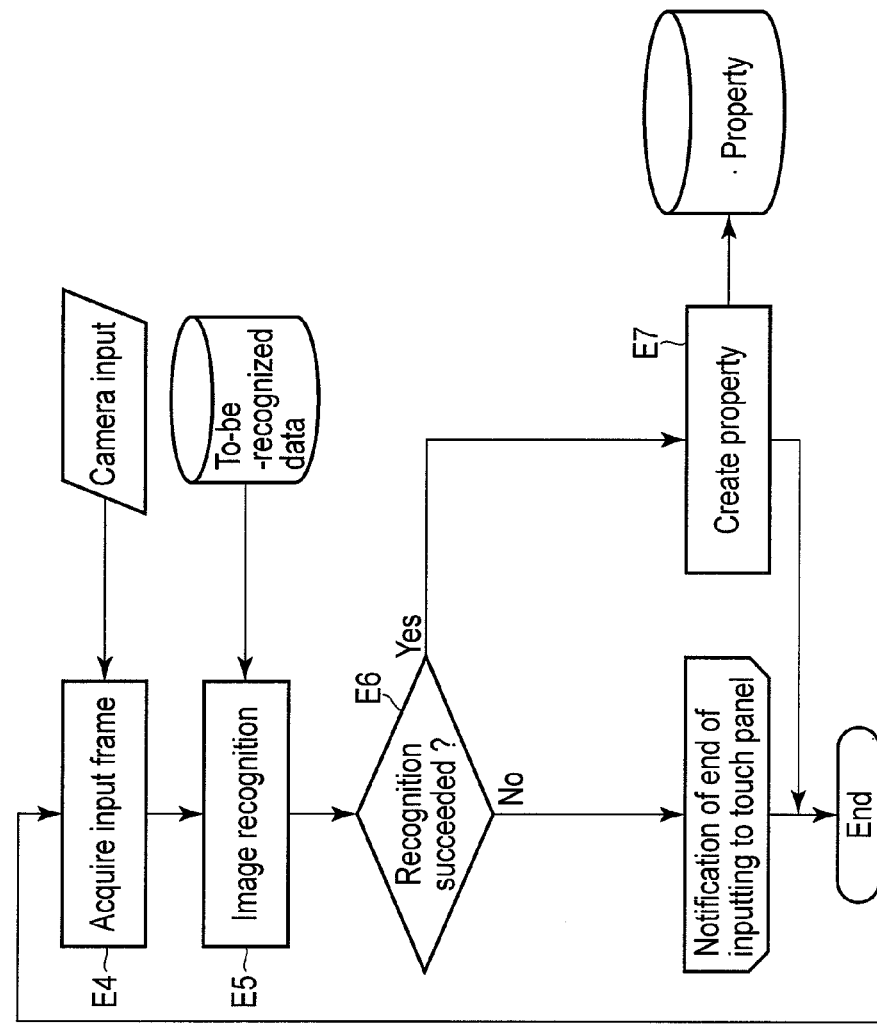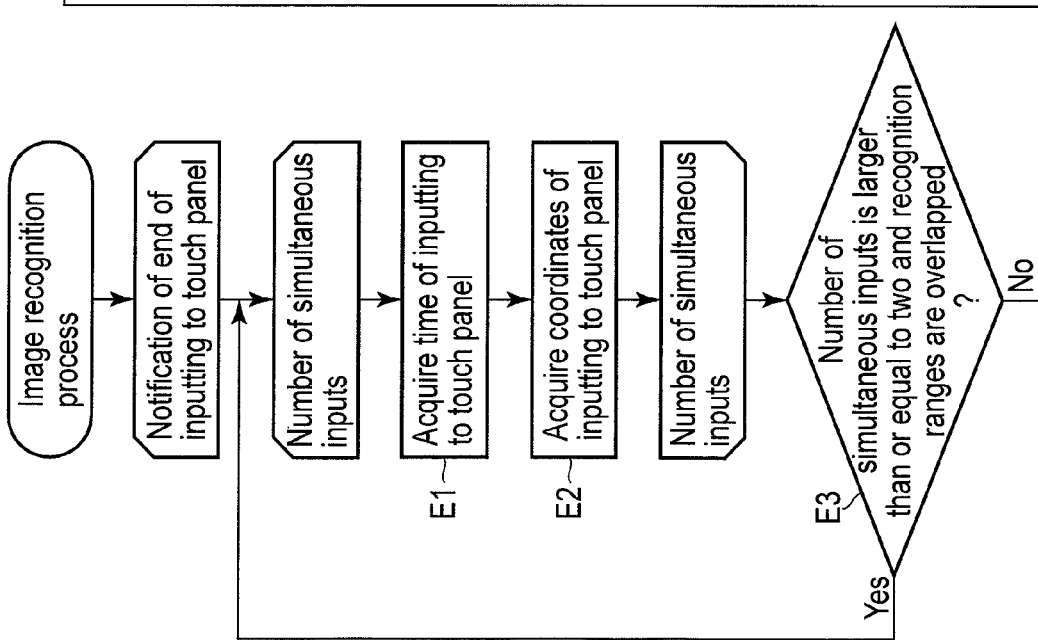
FIG. 13

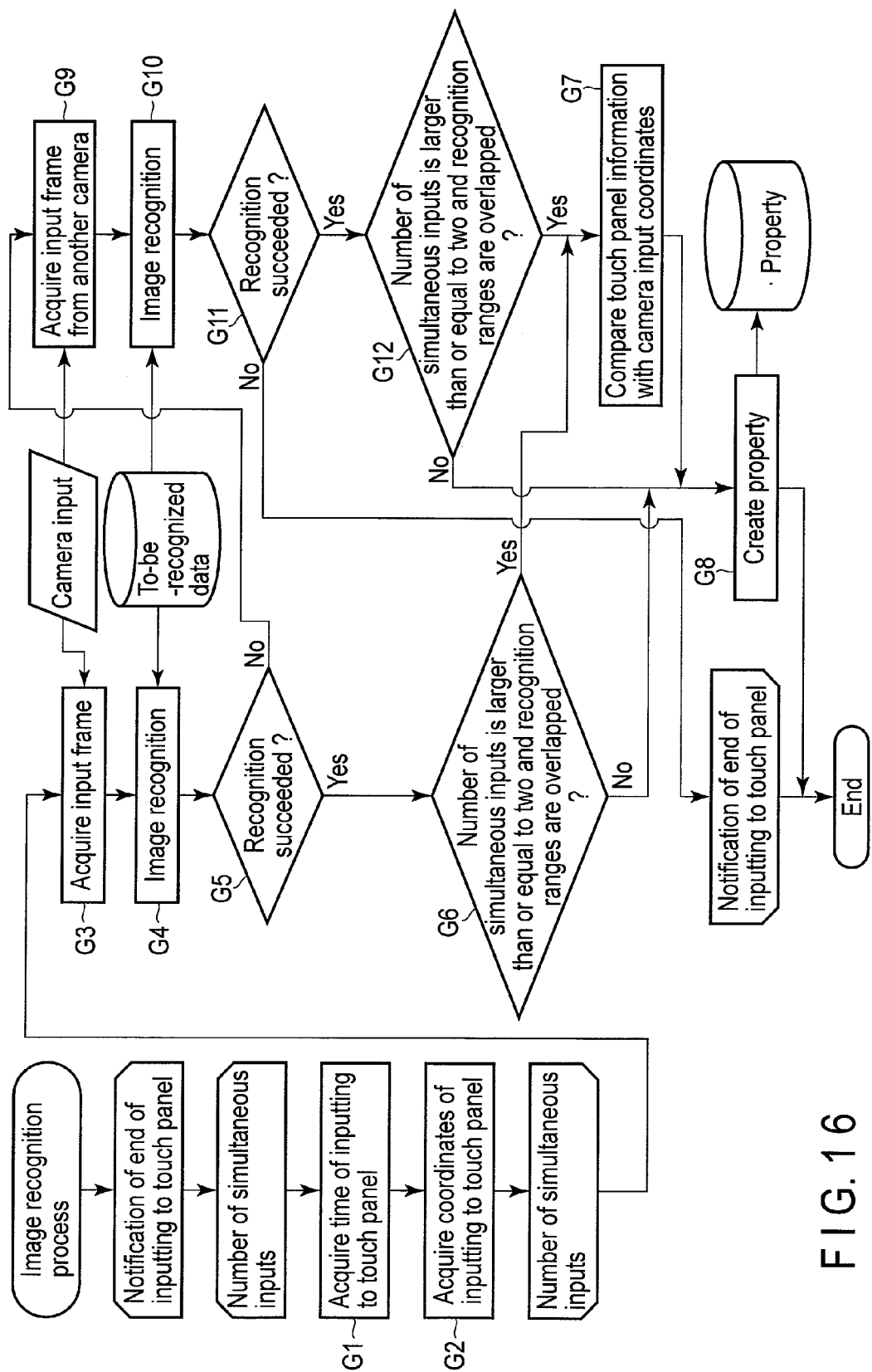
F I G. 16

INFORMATION PROCESSING APPARATUS AND COMPUTER-READABLE STORAGE MEDIUM

CROSS-REFERENCE TO RELATED APPLICATIONS

This application is based upon and claims the benefit of priority from prior Japanese Patent Application No. 2011-042623, filed Feb. 28, 2011, the entire contents of which are incorporated herein by reference.

FIELD

Embodiments described herein relate generally to an image display method suitably used for an information processing apparatus including a handwriting input function.

BACKGROUND

In recent years, various types of information processing apparatuses including handwriting input functions have started to be widely used. For example, an electronic whiteboard using a display device that includes a touch panel provided on the display screen makes it unnecessary to use a pen filled with ink, that is, a consumable, and makes it possible to simply record handwritten content as digitized image data.

Further, recently, for example, an electronic whiteboard configured to recognize a color of a writing tool by utilizing an image recognition technique and display written content to which the color obtained as the recognition result is attached is proposed.

In order to recognize a color of a writing tool used for inputting to a touch panel based on an image, a certain length of time is required. Therefore, in the electronic whiteboard or the like, when written content to which the color obtained as the recognition result is attached is displayed, a time lag until the written content is displayed after writing will become great.

Generally, in the electronic whiteboard or the like, a measure for coping with erroneous recognition at the image recognition time is not carefully considered. Therefore, for example, if the color of content is erroneously recognized as a color different from blue although the content is written with a blue writing tool, it becomes necessary to repeatedly erase the content displayed with the erroneous color and write the content again (until the content color is correctly recognized as blue). That is, in practice, it is not considered at all to take a measure for automatically making recovery without depending on the above human recovery although erroneous recognition will inevitably occur to some extent in image recognition.

Further, recently, a touch panel that copes with multi-touch for simultaneously receiving a plurality of inputs becomes dominant, but generally, the electronic whiteboard or the like does not cope with a plurality of simultaneous inputs. Therefore, if the conventional method is applied as it is, there occurs a possibility that a reflection destination of the recognition result is erroneously set and the recognition precision is markedly degraded when contents are simultaneously written in close positions on the board with black and red writing tools by two users, for example.

Therefore, in the information processing apparatus, including the electronic whiteboard described before, including the handwriting input function, it is strongly required to provide a mechanism that cancels the time lag until the written content is displayed after writing, automatically makes recovery from the erroneous recognition and maintains the recognition precision at a constant level even at the time of plural simultaneous inputs.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view showing an external appearance of an information processing apparatus of a first embodiment.

FIG. 2 is an exemplary diagram showing a system configuration of the information processing apparatus of the first embodiment.

FIG. 4 is an exemplary flowchart for illustrating an operation procedure of the handwriting support utility program run on the information processing apparatus of the first embodiment.

FIG. 6 is an exemplary view for illustrating a basic principle of a process performed by the handwriting support utility program run on the information processing apparatus of a second embodiment.

FIG. 7 is an exemplary view showing a display example of written content by use of the information processing apparatus of the second embodiment.

FIG. 13 is an exemplary flowchart showing a flow of a modification of the image recognition process performed by the handwriting support utility program run on the information processing apparatus of the fourth embodiment.

FIG. 16 is an exemplary flowchart showing a flow of a modification of the image recognition process performed by the handwriting support utility program run on the information processing apparatus of the fifth embodiment.

DETAILED DESCRIPTION

Figure 3:
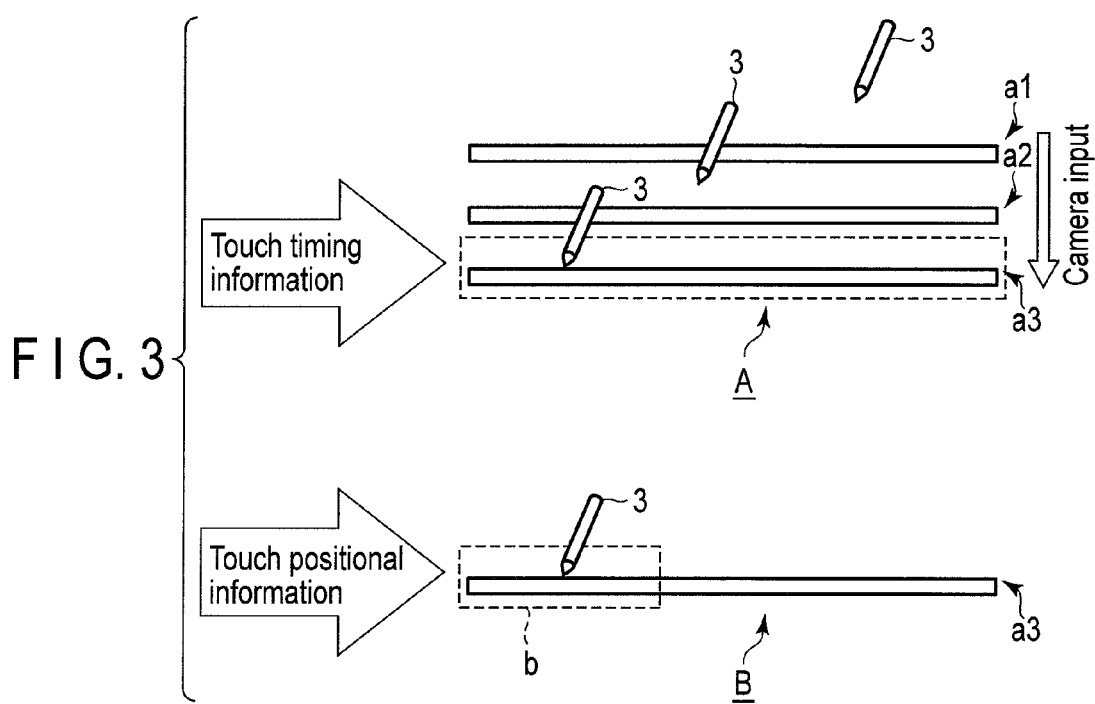
FIG. 3 is an exemplary view for illustrating a basic principle of a processing procedure performed by a handwriting support utility program run on the information processing apparatus of the first embodiment.

Various embodiments will be described hereinafter with reference to the accompanying drawings.

In general, according to one embodiment, an information processing apparatus includes a display with a touch panel, a camera, an image recognition module and a display controller. The camera is configured to acquire an image taking an object used for inputting to the touch panel. The image recognition module is configured to recognize a type of the object in the image acquired by the camera. The display controller is configured to display a locus tracing from a start of the inputting to a termination of the inputting on the display. The display controller adds an attribute corresponding to the type of the object recognized by the image recognition module to the locus displayed on the display. The image recognition module comprises a first narrowing module and a second narrowing module. The first narrowing module is configured to extract an image to be used for recognizing the type of the object from images acquired by the camera based on timing information indicating timing of the inputting. The timing information is included in input information obtained from the touch panel. The second narrowing module is configured to select a recognition range to be used for recognizing the type of the object from a photographing region of the image extracted by the first narrowing module based on positional information indicating an input position on the touch panel. The positional information is included in the input information obtained from the touch panel.

First Embodiment

First, a first embodiment is explained.

FIG. 1 is an exemplary view showing an external appearance of an information processing apparatus 1 of the present embodiment. For example, the information processing apparatus 1 is realized as a personal computer, referred to as a slate terminal, for example, that receives data input by use of a touch panel provided on the display screen of a display device.

As shown in FIG. 1, the information processing apparatus 1 has a thin board-shaped casing. On the upper central portion of the casing, a touch panel display 2 is disposed. For example, the user can perform various data input operations such as a click operation and writing input operation by setting a pen 3 in contact with the touch panel display 2. For example, if content is written on the touch panel display 2 by using the pen 3, the information processing apparatus 1 draws a locus (a holograph including dots) of handwriting and displays the locus on the touch panel display 2. Inputting to the touch panel display 2 can be made by use of not only the pen 3 but also a finger, for example.

Further, on the upper surface of the casing of the information processing apparatus 1 and in the peripheral portion of the touch panel display 2, a camera unit 4 is incorporated. The camera unit 4 is provided to photograph an image that covers the whole portion of the display screen of the touch panel display 2 including a contact body (typically, the pen 3) used for inputting to the touch panel display 2. For example, the camera unit 4 is disposed near the upper-end central portion of the touch panel display 2 to set the optical axis of a photographing lens substantially horizontal with respect to the display screen of the touch panel display 2.

The information processing apparatus 1 includes an image recognition function and can recognize the color and shape of the pen 3 based on an image if the pen 3 is included in the image photographed by the camera unit 4, for example. Further, the information processing apparatus 1 decides an attribute given to the locus displayed on the touch panel display 2 based on the recognition result. The attribute includes a color, size, shape, transparency and the like. For example, if a blue pen 3 is made to contact the touch panel display 2, a blue dot is displayed on the touch panel display 2 and if a red pen 3 is made to contact the touch panel display 2, a red dot is displayed on the touch panel display 2. If a line is drawn on the touch panel display 2 with the blue pen 3, a blue line is displayed on the touch panel display 2.

Further, for example, when the thickness of the pen 3 with the same color is different, a line or dot with the different thickness can be displayed on the touch panel display 2. Additionally, for example, if the color or shape of the pen 3 is previously set in correspondence to the shape of an object used for drawing a locus, not only the color and thickness can be used for drawing a locus but also a stamp of an animal design can be pressed on the touch panel display 2 or a picture can be drawn by use of a line configured by arranging stamps of animal designs by using objects of a shape obtained by designing an animal, for example.

It is preferable to reduce the time lag from the time when content is written on the touch panel display 2 by use of the pen 3 to the time when the content is displayed on the touch panel display 2 as far as possible. Therefore, the information processing apparatus 1 is designed with a mechanism that reduces the time lag from writing to displaying of written content and this is explained in detail below.

FIG. 2 is an exemplary diagram showing a system configuration of the information processing apparatus 1. As shown in FIG. 2, the information processing apparatus 1 includes a central processing unit (CPU) 11, memory controller hub (MCH) 12, main memory 13, I/O controller hub (ICH) 14, graphics processing unit (GPU: display controller) 15 and video memory (VRAM) 15A. Further, the information processing apparatus 1 includes a basic input/output system (BIOS)-read only memory (ROM) 16, electrically erasable programmable ROM (EEPROM) 17, solid-state drive (SSD) 18, local area network (LAN) controller 19 and wireless LAN controller 20. In addition, the information processing apparatus 1 includes a universal serial bus (USB) controller 21 and embedded controller (EC) 22.

The CPU 11 is a processor that controls the operation of the information processing apparatus 1 and executes various programs loaded from the SSD 18 to the main memory 13, for example. Among the various programs executed by the CPU 11, an OS 100 used for resource management, and handwriting support utility program 110 described later and various application programs 120 run under the control of the OS 100 are provided. Further, the CPU 11 executes a BIOS stored in the BIOS-ROM 16. The BIOS is a program used for hardware control.

The MCH 12 is operated as a bridge that connects the CPU 11 and ICH 14 to each other and operated as a memory controller that controls accesses to the main memory 13. The MCH 12 includes a function of communicating with the GPU 15.

The GPU 15 is a display controller that displays an image on the LCD 5 incorporated in the touch panel display 2 by using the video memory 15A. Further, the GPU 15A includes an accelerator that draws images to be displayed by the various programs instead of the CPU 11.

The ICH 14 is operated as a memory controller that controls accesses to the BIOS-ROM 16 and EEPROM 17. Further, the ICH 14 contains an integrated device electronics (IDE) controller that controls the SSD 18. In addition, the ICH 14 includes a function of communicating with the camera unit 4, LAN controller 19, wireless LAN controller 20, USB controller 21 and EC 22. Image data of an image photographed by the camera unit 4 is fetched by use of the ICH 14 and transferred to the main memory 13 via the MCH 12. On the main memory 13, a predetermined amount of image data (while old image data is replaced by new image data) is accumulated.

The EEPROM 17 is a storage medium that stores identification information of the information processing apparatus 1, for example. The LAN controller 19 is a wired communication device that performs wired communication of an IEEE 802.3 standard, for example. The wireless LAN controller 20 is a wireless communication device that performs wireless communication of an IEEE 802.11 standard, for example. Further, the USB controller 21 performs communication that conforms to a USB 2.0 standard with respect to a USB device that is externally connected.

The EC 22 is an embedded controller that performs power management of the information processing apparatus 1. The EC 22 contains an input controller that controls data inputting by a touch operation on the touch panel display 2.

A touch panel 6 is incorporated in the touch panel display 2 in addition to the LCD 5 described before. The touch panel 6 superimposed on the LCD 5 is a touch panel for coping with multi-touch and includes a sensor 61 and micro controller unit (MCU) 62. If touch operations are performed on n portions on the touch panel 6, all of the n portions are detected by the sensor 61 and input information including timing information indicating timing of inputting to the touch panel 6 and positional information indicating the input positions on the touch panel 6 is output from the MCU 62. The input information output from the MCU 62 is supplied to the EC 22. Then, the EC 22 stores the input information in its own register and causes the CPU 11 to read the input information stored in the register by issuing an interrupt and notifying the effect to the CPU 11. As a result, occurrence of an event of the touch operation on the touch panel 6 is transmitted to the OS 100 and the OS 100 notifies occurrence of the event to the handwriting support utility program 110 and various application programs 120.

The handwriting support utility program 110 is a program for recognizing the type of the pen 3 based on an image photographed by the camera unit 4 when content is written on the touch panel display 2 with the pen 3, for example, and displaying the written content on the touch panel display 2 based on the recognition result. Now, the basic principle of the processing procedure performed by the handwriting support utility program 110 to reduce the time lag from writing to displaying of the written content is explained with reference to FIG. 3.

As described before, image data of an image photographed by the camera unit 4 is fetched by the ICH 14 and transferred to the main memory 13 via the MCH 12. The handwriting support utility program 110 utilizes the image data accumulated in the main memory 13 to recognize the pen 3. When an image recognition process is performed for the image data accumulated in the main memory 13, the handwriting support utility program 110 first performs a narrowing operation of extracting image data used as an object of the image recognition process based on timing information included in input information output from the MCU 62 of the touch panel 6 ("A" in FIG. 3).

It is now assumed that three images are photographed by use of the camera unit 4 at timings a1, a2 and a3 as shown in "A" of FIG. 3. Further, it is assumed that the image photographed at timing a3 among the three images is an image obtained at a timing closest to the timing at which the touch operation to the touch panel 6 is performed. The handwriting support utility program 110 extracts image data of an image photographed at timing a3 as an object of the image recognition process from the three images based on timing information included in input information output from the MCU 62 of the touch panel 6.

Second, the handwriting support utility program 110 performs a narrowing operation of selecting a recognition range as an object of the image recognition process from a photographing region of image data extracted as an object of the image recognition process based on positional information included in input information output from the MCU 62 of the touch panel 6 ("B" in FIG. 3).

It is now assumed that the touch operation is performed in a position indicated in "B" of FIG. 3. The handwriting support utility program 110 cuts out recognition range b from the image region of image data based on the positional information included in the input information output from the MCU 62 of the touch panel 6.

For example, the time lag from writing to displaying of the written content can be reduced by a period until a to-be-recognized image is photographed by the camera unit 4 in comparison with a case wherein the camera unit 4 is driven and controlled to set the focus on a touch portion and photograph an image in response to a touch operation and a pen 3 is recognized based on the photographed image.

Further, the handwriting support utility program 110 reduces a processing amount by narrowing an object of an image recognition process in terms of time and space to reduce the time lag from writing to displaying of the written content. Additionally, the precision of the image recognition process can be increased by narrowing the object.

FIG. 4 is an exemplary flowchart for illustrating an operation procedure of the handwriting support utility program 110.

The handwriting support utility program 110 waits for a touch operation with respect to the touch panel 6 (block A1). When receiving notification that the touch operation is performed (occurrence of an event) from the OS 100 (YES in block A1), the program 110 determines start of inputting to the touch panel 6 (block A2) and starts the image recognition process and drawing data display process (blocks A3, A4).

When inputting to the touch panel 6 is started, the handwriting support utility program 110 acquires input coordinates based on positional information included in input information output from the MCU 62 of the touch panel 6 (block A5). Then, the handwriting support utility program 110 creates drawing data expressing a locus of the thus acquired input coordinates (block A6). The drawing data is created as vector data, for example, and is stored in the main memory 13 or SSD 18.

Figure 5:
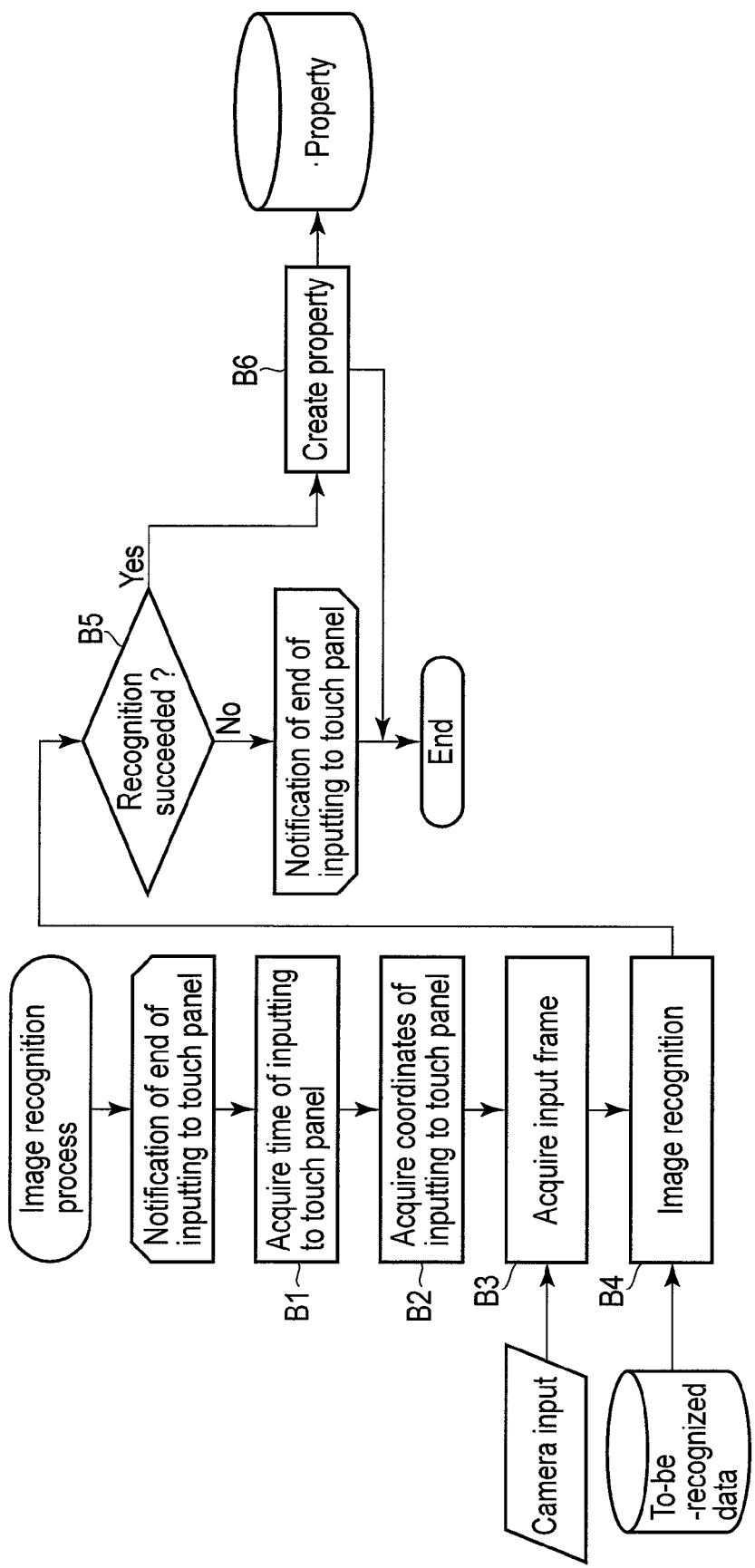
FIG. 5 is an exemplary flowchart showing a flow of an image recognition process performed by the handwriting support utility program run on the information processing apparatus of the first embodiment.

The handwriting support utility program 110 recognizes the color or the like of a pen 3 based on an image photographed by the camera unit 4 (block A3) while narrowing an object of an image recognition process in terms of time and space based on timing information and positional information included in input information output from the MCU 62 of the touch panel 6 in parallel with the above drawing data creation process. FIG. 5 is an exemplary flowchart showing a flow of an image recognition process performed by the handwriting support utility program 110.

After receiving notification that the touch operation is performed (occurrence of an event) from the OS 100, the handwriting support utility program 110 repeatedly performs the process of block B1 to block B5 as an image recognition process at predetermined intervals until the notification is interrupted or recognition is successfully made. More specifically, first, the handwriting support utility program 110 acquires an input time based on timing information included in the input information output from the MCU 62 of the touch panel 6 (block B1). Further, the handwriting support utility program 110 acquires input coordinates based on positional information included in the input information output from the MCU 62 of the touch panel 6 (block B2).

Next, the handwriting support utility program 110 acquires image data of an image photographed by the camera unit 4 based on the acquired input time (block B3) and performs an image recognition process for a region of a predetermined range selected from the acquired image data based on the acquired input coordinates (block B4). Then, if recognition is successfully made (YES in block B5), the handwriting support utility program 110 stores the recognition result in the main memory 13 or SSD 18 as a property (block B6). The property indicates an attribute provided when drawing data is displayed on the LCD 5.

With reference to FIG. 4 again, the handwriting support utility program 110 displays drawing data created according to the acquired input coordinates (while providing an attribute indicated by the property) on the LCD 5 based on the property that is the result of the image recognition process. Further, when notification of occurrence of an event from the OS 100 is interrupted, the handwriting support utility program 110 determines that inputting to the touch panel 6 is terminated (block A7) and terminates the image recognition process and drawing data display process.

Second Embodiment

Next, a second embodiment is explained.

FIG. 6 is an exemplary view for illustrating a basic principle of a process performed by the handwriting support utility program 110 of the present embodiment to reduce the time lag from writing to displaying of written content.

As described before, the handwriting support utility program 110 acquires input coordinates based on positional information included in input information output from the MCU 62 of the touch panel 6 and creates drawing data expressing a locus of the thus acquired input coordinates. Further, the handwriting support utility program 110 subjects an image photographed by a camera unit 4 to an image recognition process to create a property. Then, the handwriting support utility program 110 provides an attribute indicated by the created property to display the created drawing data on an LCD 5.

At this time, if the displaying the created drawing data on the LCD 5 is waited until a property is created, a time lag from writing to displaying of written content occurs. Therefore, the handwriting support utility program 110 of the present embodiment displays drawing data by using a predetermined property until a property is created and redisplays the drawing data by using the created property when the property is created.

After receiving notification that the touch operation to the touch panel 6 is performed (occurrence of an event) from the OS 100, the handwriting support utility program 110 performs an image recognition process for an image photographed by the camera unit 4 at predetermined intervals.

Suppose now that the user uses a blue pen 3 to write content on the touch panel 6. Further, suppose that the pen 3 is not successfully recognized in the image recognition process at timings c1 to c4 as shown in FIG. 6 and the pen 3 is successfully recognized (the blue pen can be recognized) in the image recognition process at timing c5.

For example, if a property indicating an attribute of black is assigned as a predetermined property, the handwriting support utility program 110 first displays drawing data in black on the LCD 5 (d1 in FIG. 6: broken lines). The process of displaying the drawing data in black is continued until the pen 3 is recognized as a blue pen at timing c5. Then, when recognizing that the pen 3 is recognized as blue, the handwriting support utility program 110 changes the attribute of the drawing data that has been displayed so far from black to blue and provides the attribute of blue to display drawing data on the LCD 5 after this (d2 in FIG. 6: solid lines).

The difference from the handwriting support utility program 110 of the first embodiment described before is explained with reference to the flowchart shown in FIG. 4. The handwriting support utility program 110 of the present embodiment performs a drawing data display process in block A4 by using a predetermined property until the image recognition process of block A3 is successfully performed. Further, the handwriting support utility program 110 of this embodiment updates the property used in the drawing data display process of block A4 when the image recognition process of block A3 is successfully performed.

If successfully recognizing the pen 3 at timing c5, the handwriting support utility program 110 may terminate the image recognition process after this in order to reduce the load of the information processing apparatus 1.

That is, in the information processing apparatus of this embodiment, since written content is temporarily displayed in black on the LCD 5, for example, in a period to timing c5 at which the pen 3 is recognized as blue, the user can be prevented from actually feeling a time lag from writing to displaying of written content.

A color is taken as an example as the attribute indicated by the property, but the pen 3 can be recognized based on an image according to not only the color but also the thickness thereof. Therefore, drawing data may be displayed on the LCD 5 with the thickness assigned as an initial value at the start time of inputting to the touch panel 6 and then the thickness may be changed to a thickness corresponding to the recognition result when the thickness is recognized. Further, the property can of course be configured by a combination of the color and thickness. It is also possible to change a color according to thickness.

Further, since the shape of the pen 3 can be recognized based on an image, a display control process of providing an attribute of blue when a first shape is recognized and providing an attribute of red when a second shape is recognized can be performed by separately and selectively using properties. Further, transparency can be used as an attribute instead of the color and thickness to utilize the pen 3 as a so-called marker pen. Additionally, as shown in FIG. 7, if drawing data is displayed on the LCD 5 by using an object with a shape obtained by designing an animal, for example, the information processing apparatus 1 can be utilized as a drawing tool for children.

Third Embodiment

Next, a third embodiment is explained.

Figure 8:
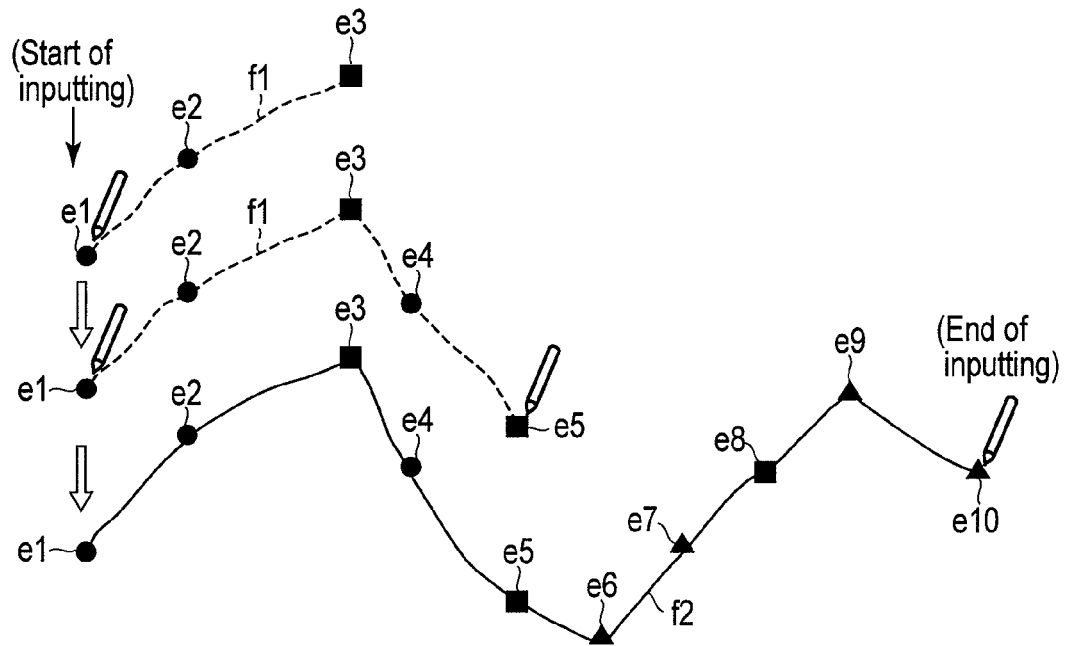
FIG. 8 is an exemplary view for illustrating a basic principle of a process performed by the handwriting support utility program run on the information processing apparatus of a third embodiment.

FIG. 8 is an exemplary view for illustrating a basic principle of a process performed by the handwriting support utility program 110 of the present embodiment to automatically make recovery from erroneous recognition.

After receiving notification that a touch operation is performed (occurrence of an event) from an OS 100, the handwriting support utility program 110 of this embodiment repeatedly performs an image recognition process at predetermined intervals until the notification is interrupted. Further, the image recognition process is continuously performed even when recognition is successfully made during this time.

In FIG. 8, black circular dots indicate that the image recognition process is performed but results in failure in recognition (for example, at timing e1). Further, black square dots indicate that the color of the pen 3 is recognized as blue by the image recognition process (for example, at timing e3). Black triangular dots indicate that the color of the pen 3 is recognized as green by the image recognition process (for example, at timing e6).

In the example shown in FIG. 8, the color of the pen 3 is successfully recognized for the first time at timing e3 after inputting to the touch panel 6 is started. Therefore, the handwriting support utility program 110 of this embodiment displays drawing data in black assigned as a default color, for example, until timing e3 is reached (f1 in FIG. 8: broken lines).

The handwriting support utility program 110 of this embodiment continuously performs the image recognition process after timing e3 at which the color of the pen 3 is successfully recognized. Further, the handwriting support utility program 110 of this embodiment continuously displays drawing data in black assigned as a default color, for example, after timing e3.

Then, when inputting to the touch panel 6 is terminated, the handwriting support utility program 110 of this embodiment collects the colors of the pens 3 recognized in a period from the start time of inputting to the touch panel 6 to the end time of inputting for the respective colors. In the example of FIG. 8, blue is recognized three times (timings e3, e5 and e8) and green is recognized four times (timings e6, e7, e9 and e10). Therefore, the handwriting support utility program 110 of this embodiment selects green that is most often recognized based on decision by majority and changes the attribute of already displayed drawing data from black to green (f2 in FIG. 8: solid lines).

That is, even when green is erroneously recognized as blue in the image recognition process at timing e3 (at which the color is first successfully recognized), recovery is automatically made from the erroneous recognition. When inputting to the touch panel 6 is terminated, written content is updated from the default color to a correct color of green. As a result, the precision of the image recognition process can be increased.

Figure 9:
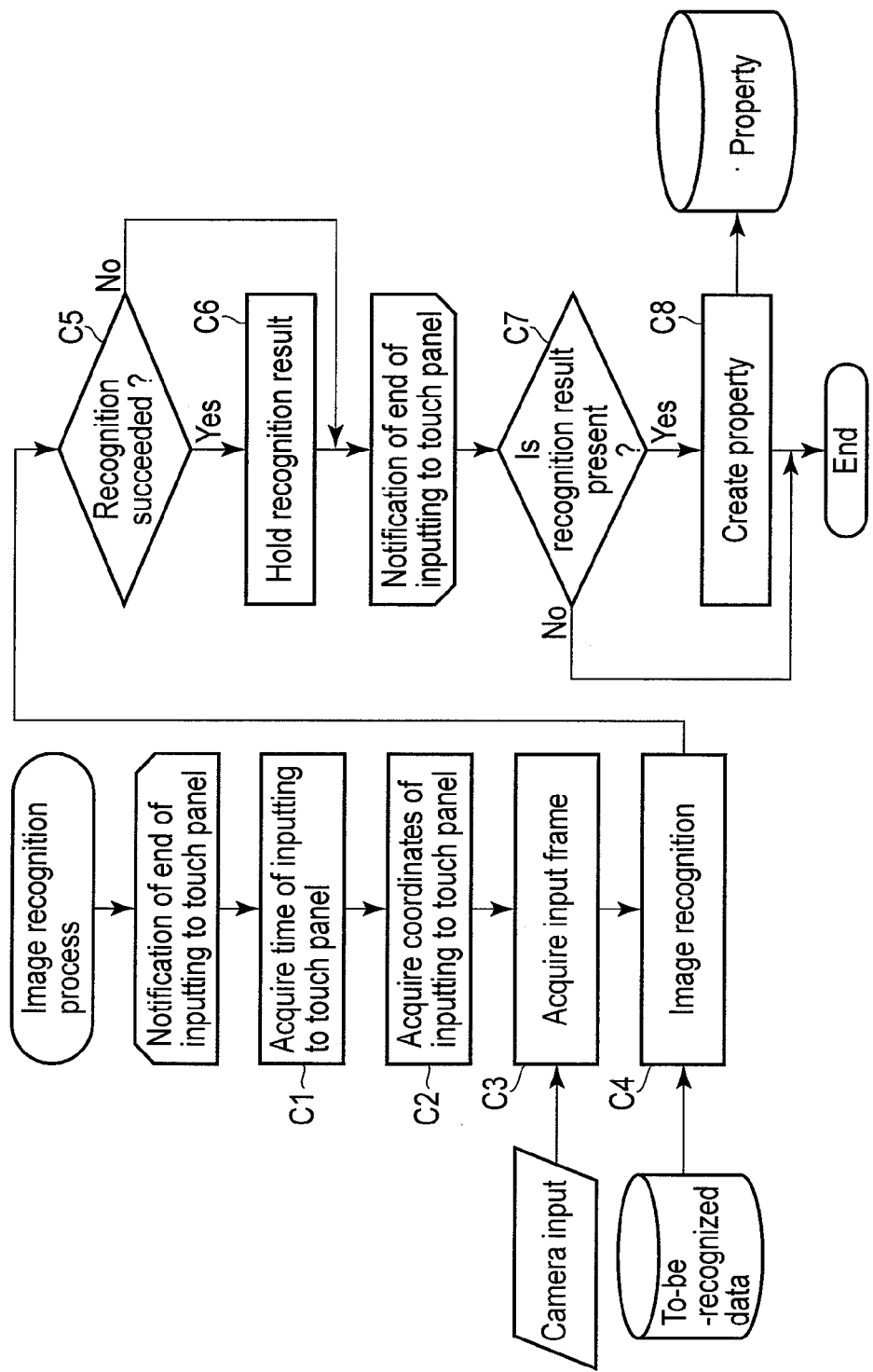
FIG. 9 is an exemplary flowchart showing a flow of an image recognition process performed by the handwriting support utility program run on the information processing apparatus of the third embodiment.

FIG. 9 is an exemplary flowchart showing a flow of the image recognition process performed by the handwriting support utility program 110 of this embodiment.

After receiving notification that the touch operation is performed (occurrence of an event) from the OS 100, the handwriting support utility program 110 repeatedly performs the process of block C1 to block C6 as an image recognition process at predetermined intervals until the notification is interrupted (even when recognition is successfully made halfway). More specifically, first, the handwriting support utility program 110 acquires an inputting time based on timing information included in input information output from an MCU 62 of the touch panel 6 (block C1). Further, the handwriting support utility program 110 acquires input coordinates based on positional information included in the input information output from the MCU 62 of the touch panel 6 (block C2).

Next, the handwriting support utility program 110 acquires image data of an image photographed by the camera unit 4 based on the acquired inputting time (block C3) and performs an image recognition process for a region of a predetermined range selected from the acquired image data based on the acquired input coordinates (block C4). Then, if recognition is successfully made (YES in block C5), the handwriting support utility program 110 temporarily stores the recognition result in the main memory 13 or SSD 18 (block C6).

The handwriting support utility program 110 that repeatedly performs the process of block C1 to block C6 while the notification that the touch operation is performed (occurrence of an event) is received from the OS 100 checks whether recognition is successfully made even once or not, that is, whether the recognition result held in the main memory 13 or SSD 18 is present or not (block C7) when the notification is interrupted. If the recognition result is present (YES in block C7), the majority of recognition results is taken to create a property and it is stored in the main memory 13 or SSD 18 (block C8).

In this example, a case wherein drawing data is displayed in black that is a default color, for example, after inputting to the touch panel 6 is started and black is changed to, for example, green selected by majority decision when inputting to the touch panel 6 is terminated is explained. Instead of this, the majority decision may be taken for each time at which image recognition is successfully made and a display color may be adequately changed.

Figure 10:
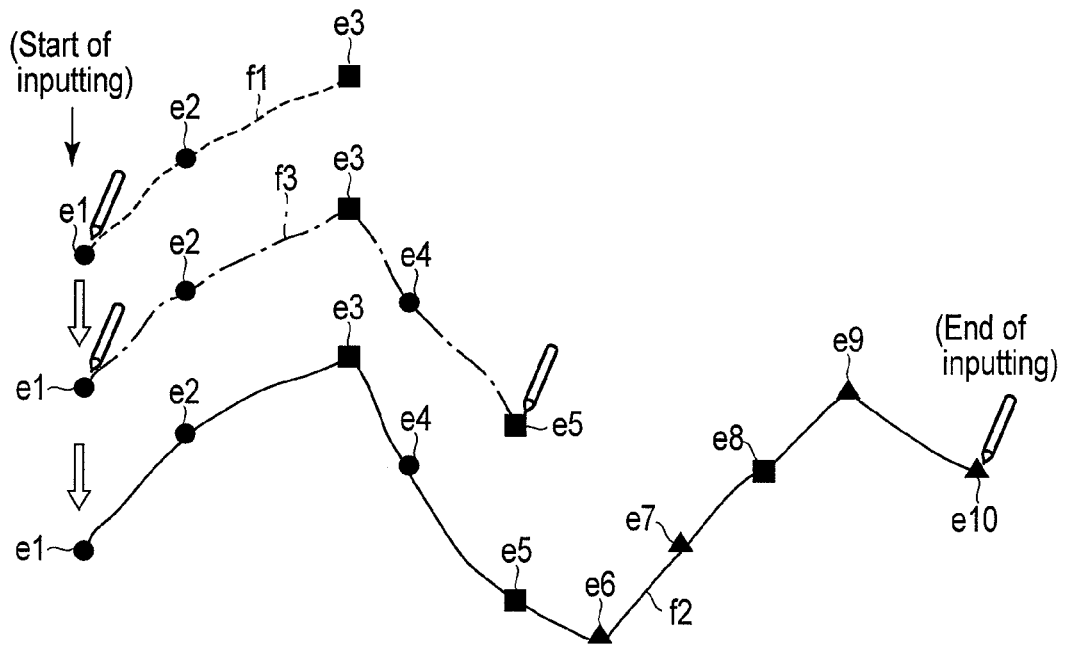
FIG. 10 is an exemplary view for illustrating a modification of the process performed by the handwriting support utility program run on the information processing apparatus of the third embodiment.

For example, as shown in FIG. 10, drawing data is displayed in black that is a default color (f1 in FIG. 10: broken lines) until the display color is recognized as blue at timing e3. If the display color is recognized as blue at timing e3, the display color is changed from black to blue (f3 in FIG. 10: one-dot-dash lines). After this, since blue is recognized at timing e5, the display color is maintained to be blue. When time has further elapsed and the number of times by which green is recognized exceeds the number of times by which blue is recognized at timing e10, the display color is changed from blue to green at this timing (f2 in FIG. 10: solid lines).

Thus, the image recognition result can be reflected on drawing data display on the real-time basis without waiting for termination of inputting to the touch panel 6.

Fourth Embodiment

Next, a fourth embodiment is explained.

Figure 11:
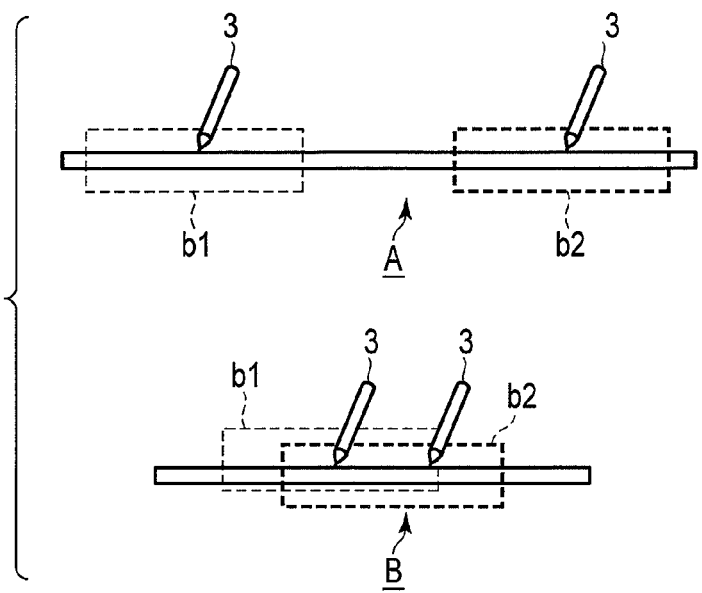
FIG. 11 is an exemplary view showing an example of simultaneous inputting to a touch panel by use of two pens performed in the information processing apparatus of a fourth embodiment.

As described before, a touch panel 6 incorporated in a touch panel display 2 and superimposed on an LCD 5 is a touch panel for coping with multi-touch. An information processing apparatus 1 supports simultaneous inputting by use of a plurality of pens 3. FIG. 11 shows an example of simultaneous inputting to the touch panel 6 by use of two pens 3 performed in the information processing apparatus 1.

Suppose now that simultaneous inputting to the touch panel 6 by use of two pens 3 is performed with a certain distance therebetween ("A" in FIG. 11). As described before, a handwriting support utility program 110 extracts drawing data treated as an object of an image recognition process based on timing information included in input information output from an MCU 62 of the touch panel 6 and cuts out a recognition range from the image region of image data based on positional information included in the input information output from the MCU 62 of the touch panel 6. When simultaneous inputting to the touch panel 6 by use of the two pens is made with a certain distance, the recognition ranges are selected without overlapping from the image region as shown in "A" of FIG. 11 (recognition ranges b1, b2). In this case, since a to-be-recognized object is included in each recognition range, recognition of the pen 3 can be performed with the same precision as that of a case of single touch.

Next, suppose that simultaneous inputting to the touch panel 6 by use of the two pens is made with a close distance ("B" in FIG. 11). In this case, two recognition ranges may overlap on each other in the image region as shown in "B" of FIG. 11 (recognition ranges b1, b2). Then, a plurality of subject images that may be a to-be-recognized object can be included in one recognition range. If the plural subject images that may be a to-be-recognized object are included in one recognition range, there will occur a possibility that the reflection destination of the recognition result is erroneously set and the recognition precision is markedly degraded in comparison with a case of single touch.

Therefore, the handwriting support utility program 110 of this embodiment includes a mechanism that prevents the recognition precision from being degraded in the above case and maintains the recognition precision at a predetermined level. More specifically, the handwriting support utility program 110 of this embodiment utilizes positional information included in input information output from the MCU 62 of the touch panel 6 not only to cut out the recognition range from the image region but also to correspond to the reflection destination of each recognition result when a plurality of subject images that may be a to-be-recognized object are included in the cutout recognition range.

For example, as shown in FIG. 1, when the camera unit 4 is disposed near the upper central portion of the touch panel display 2, the handwriting support utility program 110 utilizes coordinate information in an X-axis direction of positional information included in input information output from the MCU 62 of the touch panel 6 to decide the reflection destination of each recognition result of a plurality of subject images included in the recognition range. This is true when the camera unit 4 is disposed near the lower central portion of the touch panel display 2.

Further, when the camera unit 4 is disposed near the left-end or right-end central portion of the touch panel display 2, the handwriting support utility program 110 utilizes coordinate information in a Y-axis direction of positional information included in input information output from the MCU 62 of the touch panel 6 to decide the reflection destination of each recognition result of a plurality of subject images included in the recognition range.

Figure 12:
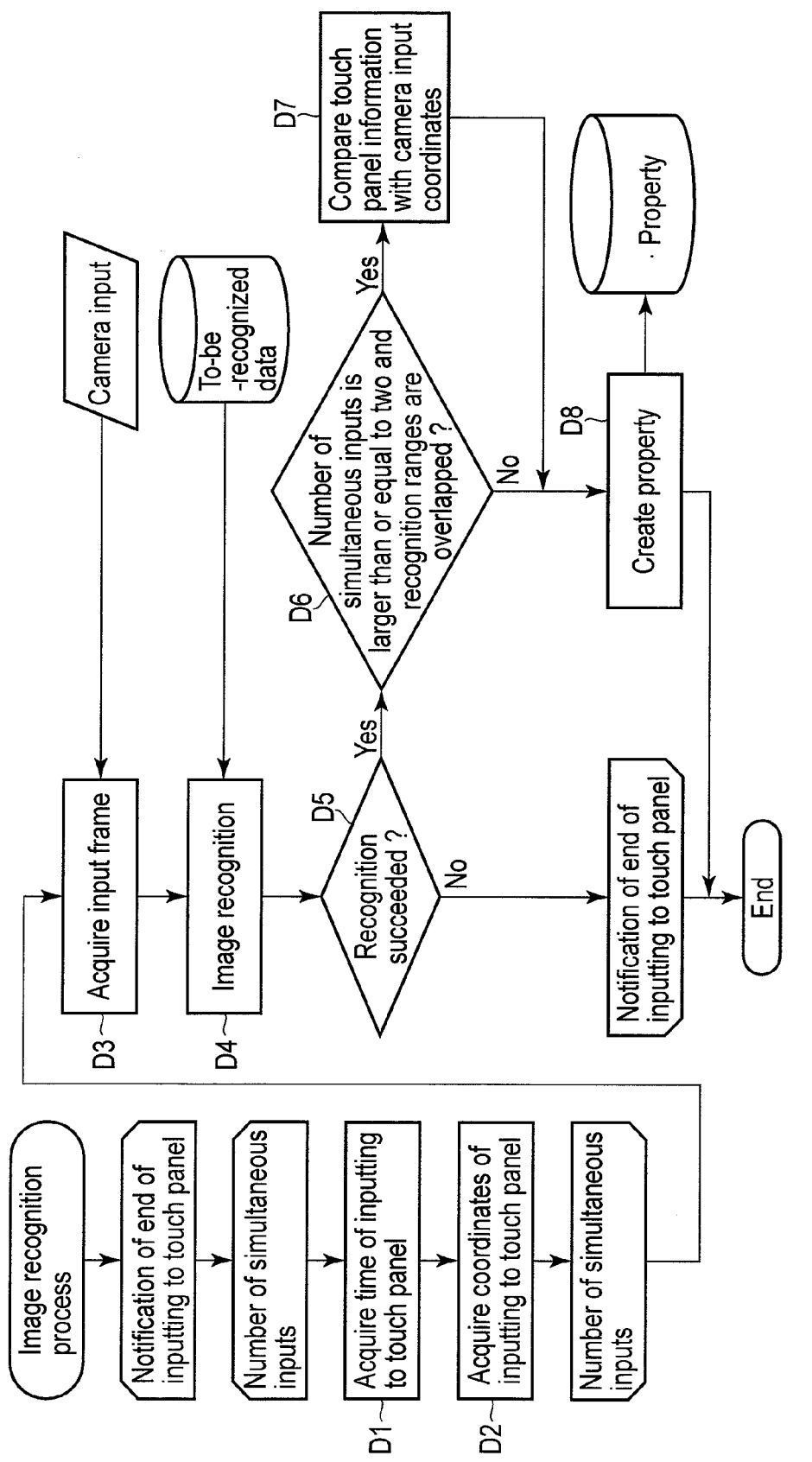
FIG. 12 is an exemplary flowchart showing a flow of an image recognition process performed by the handwriting support utility program run on the information processing apparatus of the fourth embodiment.

FIG. 12 is an exemplary flowchart showing a flow of an image recognition process performed by the handwriting support utility program 110 of this embodiment.

After receiving notification that the touch operation is performed (occurrence of an event) from the OS 100, the handwriting support utility program 110 repeatedly performs the process of block D1 to block D8 as an image recognition process at predetermined intervals until the notification is interrupted or recognition is successfully made. More specifically, first, the handwriting support utility program 110 acquires an input time based on timing information included in input information output from the MCU 62 of the touch panel 6 (block D1).

Further, the handwriting support utility program 110 acquires input coordinates based on positional information included in the input information output from the MCU 62 of the touch panel 6 (block D2). The handwriting support utility program 110 repeatedly performs the process of block D1 to block D2 by a number of times corresponding to the number of simultaneous inputs.

Next, the handwriting support utility program 110 acquires image data of an image photographed by the camera unit 4 based on the acquired input time (block D3) and performs an image recognition process for a region of a predetermined range selected from the acquired image data based on the acquired input coordinates (block D4).

If recognition is successfully made (YES in block D5), the handwriting support utility program 110 then checks whether or not the number of simultaneous inputs is larger than or equal to two and whether or not the recognition ranges are overlapped (block D6). If the number of simultaneous inputs is larger than or equal to two and the recognition ranges are overlapped (YES in block D6), the handwriting support utility program 110 creates properties of a number corresponding to the number of simultaneous inputs and stores the result in the main memory 13 or SSD 18 (block D8) while comparing the positional information included in the input information output from the MCU 62 of the touch panel 6 with positional information on the image data acquired by use of the camera unit 4 (block D7).

If the number of simultaneous inputs is less than two or the recognition ranges are not overlapped (NO in block D6), the handwriting support utility program 110 stores the recognition result as a property in the main memory 13 or SSD 18 without comparing the positional information included in the input information output from the MCU 62 of the touch panel 6 with positional information on the image data acquired by use of the camera unit 4.

Thus, even if simultaneous inputting to the touch panel 6 by use of the two pens is made with a relatively short distance and a plurality of subject images that can be treated as a to-be-recognized object are included in one recognition range, the operation of erroneously setting a reflection destination of the recognition result can be prevented and the recognition precision can be maintained at a predetermined level.

In this example, a case wherein the reflection destination of the recognition result in the image recognition process is decided by using positional information included in the input information output from the MCU 62 of the touch panel 6 is explained. As described before, the handwriting support utility program 110 repeatedly performs the image recognition process for recognizing the pen 3 at predetermined intervals.

By taking this into consideration, it is considered to prevent the recognition precision from being degraded by skipping the image recognition process at the time when a plurality of subject images that can be treated as a to-be-recognized object are included in one recognition range. FIG. 13 is an exemplary flowchart showing a flow of an image recognition process performed by the handwriting support utility program at this case.

After receiving notification that the touch operation is performed (occurrence of an event) from the OS 100, the handwriting support utility program 110 repeatedly performs the process of block E1 to block E7 as an image recognition process at predetermined intervals until the notification is interrupted or recognition is successfully made. More specifically, first, the handwriting support utility program 110 acquires an input time based on timing information included in input information output from the MCU 62 of the touch panel 6 (block E1). Further, the handwriting support utility program 110 acquires input coordinates based on positional information included in the input information output from the MCU 62 of the touch panel 6 (block E2). The handwriting support utility program 110 repeatedly performs the process of block E1 to block E2 by a number of times corresponding to the number of simultaneous inputs.

At this time, the handwriting support utility program 110 checks whether or not the number of simultaneous inputs is larger than or equal to two and whether or not the recognition ranges are overlapped (block E3). If the number of simultaneous inputs is larger than or equal to two and the recognition ranges are overlapped (YES in block E3), the handwriting support utility program 110 interrupts a succeeding process in the image recognition process at this timing.

If the number of simultaneous inputs is less than two or the recognition ranges are not overlapped (NO in block E3), the handwriting support utility program 110 acquires image data of an image photographed by the camera unit 4 based on the acquired input time (block E4) and performs an image recognition process for a region of a predetermined range selected from the acquired image data based on the acquired input coordinates (block E5). Then, if recognition is successfully made (YES in block E6), the handwriting support utility program 110 stores the recognition result as a property in the main memory 13 or SSD 18 (block E7).

As described above, the recognition precision can be prevented from being degraded by skipping the image recognition process at the time when two recognition ranges are overlapped on each other in the image region.

Fifth Embodiment

Next, a fifth embodiment is explained.

In the first to fourth embodiments described above, it is supposed that one camera unit 4 is disposed on the peripheral portion of the touch panel display 2. In an information processing apparatus 1 of this embodiment, a plurality of camera units 4 are disposed on the peripheral portion of a touch panel display 2. In this example, a case wherein two camera units 4 are disposed as shown in FIG. 14 is explained.

Figure 14:
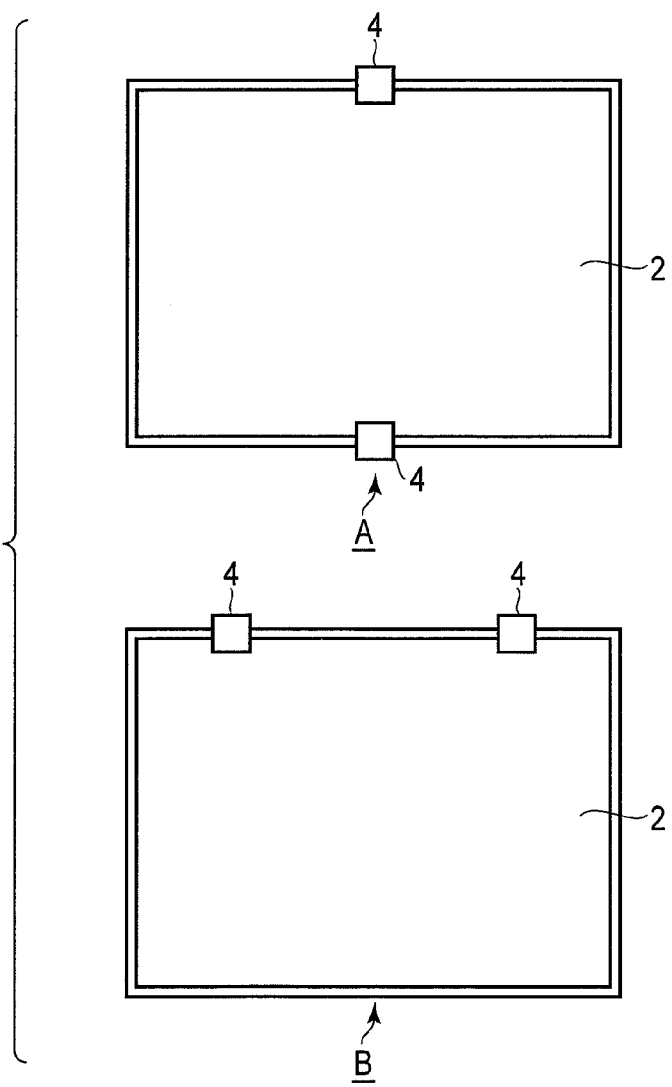
FIG. 14 is an exemplary view showing a setting example of plural camera units in an information processing apparatus of a fifth embodiment.

As shown in FIG. 14, for example, the two camera units 4 may be respectively disposed near the upper central portion of the touch panel display 2 and near the lower central portion of the touch panel display 2 ("A" in FIG. 14). Further, for example, the two camera units 4 may be disposed on the upper end portion of the touch panel display 2 with the distances thereof from the upper central portion of the touch panel display 2 set equal ("B" in FIG. 14). That is, the disposal of plural camera units 4 is not specifically limited.

The handwriting support utility program 110 of this embodiment recognizes a pen 3 by using one of two images photographed by the two camera units 4 and changes an image used for the image recognition process when recognition of the pen 3 results in failure. As a result, an attempt is made to increase the recognition precision.

Figure 15:
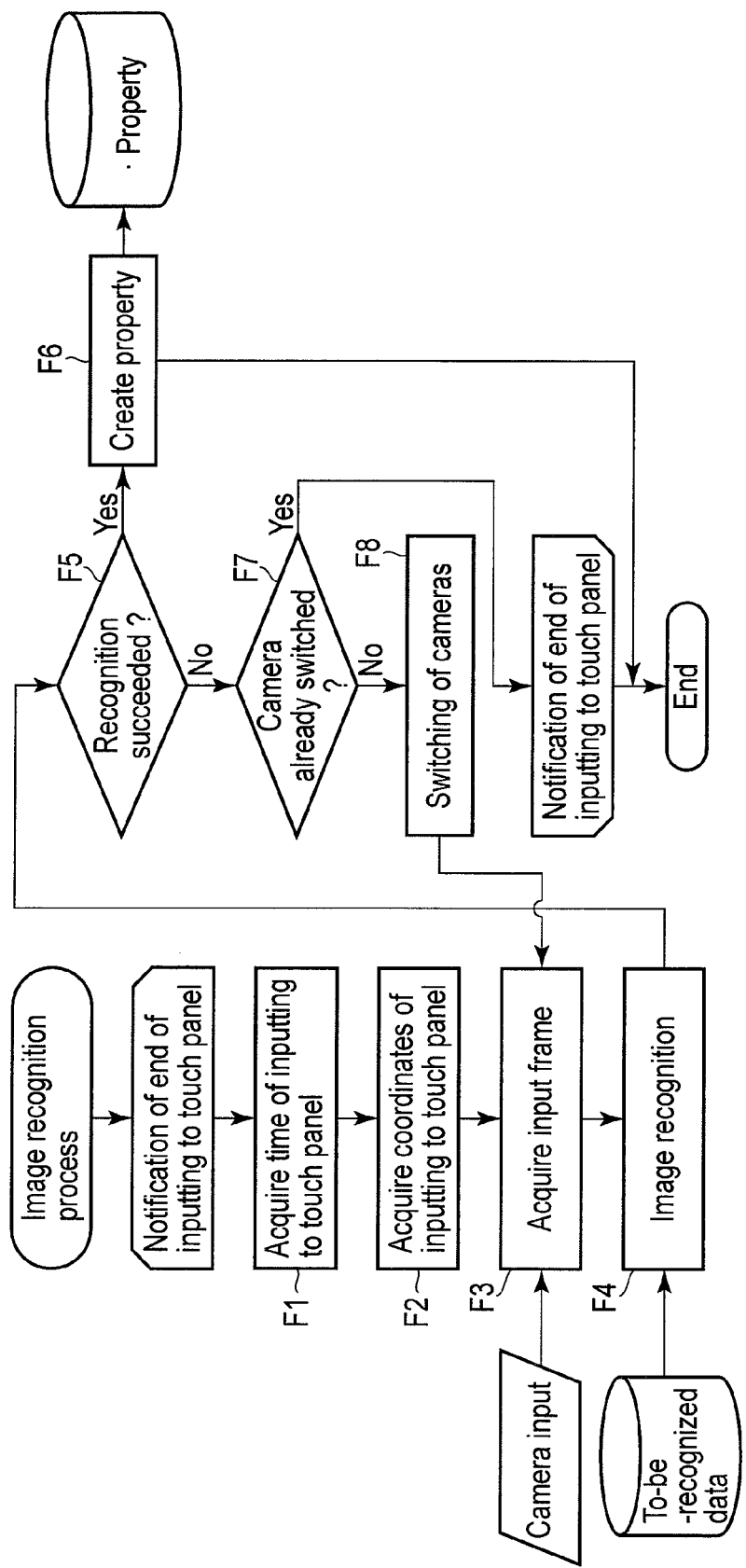
FIG. 15 is an exemplary flowchart showing a flow of an image recognition process performed by a handwriting support utility program run on the information processing apparatus of the fifth embodiment.

FIG. 15 is an exemplary flowchart showing a flow of an image recognition process performed by a handwriting support utility program 110 of this embodiment.

After receiving notification that the touch operation is performed (occurrence of an event) from the OS 100, the handwriting support utility program 110 repeatedly performs the process of block F1 to block F8 as an image recognition process at predetermined intervals until the notification is interrupted or recognition is successfully made. More specifically, first, the handwriting support utility program 110 acquires an input time based on timing information included in input information output from an MCU 62 of a touch panel 6 (block F1). Further, the handwriting support utility program 110 acquires input coordinates based on positional information included in the input information output from the MCU 62 of the touch panel 6 (block F2).

Next, the handwriting support utility program 110 acquires image data of an image photographed by one of the camera units 4 selected at this time based on the acquired input time (block F3) and performs an image recognition process for a region of a predetermined range selected from the acquired image data based on the acquired input coordinates (block F4). Then, if recognition is successfully made (YES in block F5), the handwriting support utility program 110 stores the recognition result as a property in the main memory 13 or SSD 18 (block F6).

If recognition results in failure (NO in block F5), the handwriting support utility program 110 checks whether or not the camera unit 4 is already switched (block F7). Then, if the camera unit 4 is not yet switched (NO in block F7), the camera unit 4 is switched (block F8) and a process starting from block F3 is repeatedly performed to perform the image recognition process for image data of an image photographed by the above camera unit 4.

In this example, a case wherein an image used for recognition of the pen 3 is adequately switched between the two images photographed by the two camera units 4 is explained. That is, it is supposed that the two camera units 4 photograph images in parallel. Instead of this, it is possible to start the operation of the camera unit 4 to be newly used and stop the operation of the original camera unit 4 to be replaced at the time of switching the image used for recognition of the pen 3.

FIG. 16 is an exemplary flowchart showing a flow of a image recognition process performed by the handwriting support utility program 110 of this embodiment that is designed by taking simultaneous inputs to the touch panel 6 by use of the two pens into consideration.

After receiving notification that the touch operation is performed (occurrence of an event) from the OS 100, the handwriting support utility program 110 repeatedly performs the process of block G1 to block G12 as an image recognition process at predetermined intervals until the notification is interrupted or recognition is successfully made. More specifically, first, the handwriting support utility program 110 acquires an input time based on timing information included in input information output from the MCU 62 of the touch panel 6 (block G1). Further, the handwriting support utility program 110 acquires input coordinates based on positional information included in the input information output from the MCU 62 of the touch panel 6 (block G2). The handwriting support utility program 110 repeatedly performs the process of block G1 to block G2 by a number of times corresponding to the number of simultaneous inputs.

Next, the handwriting support utility program 110 acquires image data of an image photographed by the camera unit 4 selected at this time based on the acquired input time (block G3) and performs an image recognition process for a region of a predetermined range selected from the acquired image data based on the acquired input coordinates (block G4).

If recognition is successfully made (YES in block G5), the handwriting support utility program 110 checks whether or not the number of simultaneous inputs is larger than or equal to two and whether or not the recognition ranges are overlapped (block G6). If the number of simultaneous inputs is larger than or equal to two and the recognition ranges are overlapped (YES in block G6), the handwriting support utility program 110 creates properties of a number corresponding to the number of simultaneous inputs and stores the result in the main memory 13 or SSD 18 (block G8) while comparing the positional information included in the input information output from the MCU 62 of the touch panel 6 with positional information on the image data acquired by use of the camera unit 4 (block G7).

If the number of simultaneous inputs is less than two or the recognition ranges are not overlapped (NO in block G6), the handwriting support utility program 110 stores the recognition result in the main memory 13 or SSD 18 without comparing the positional information included in the input information output from the MCU 62 of the touch panel 6 with the positional information on the image data acquired by use of the camera unit 4.

If recognition results in failure (NO in block G5), the handwriting support utility program 110 acquires image data of an image photographed by the other camera unit 4 based on the input time acquired in block G1 (block G9) and performs an image recognition process for a region of a predetermined range selected from the acquired image data based on the input coordinates acquired in block G2 (block G10).

If recognition is successfully made (YES in block G11), the handwriting support utility program 110 checks whether or not the number of simultaneous inputs is larger than or equal to two and whether or not the recognition ranges are overlapped (block G12). If the number of simultaneous inputs is larger than or equal to two and the recognition ranges are overlapped (YES in block G12), the handwriting support utility program 110 creates properties of a number corresponding to the number of simultaneous inputs and stores the result in the main memory 13 or SSD 18 (block G8) while comparing the positional information included in the input information output from the MCU 62 of the touch panel 6 with positional information on the image data acquired by use of the camera unit 4 (block G7).

If the number of simultaneous inputs is less than two or the recognition ranges are not overlapped (NO in block G12), the handwriting support utility program 110 stores the recognition result as a property in the main memory 13 or SSD 18 without comparing the positional information included in the input information output from the MCU 62 of the touch panel 6 with the positional information on the image data acquired by use of the camera unit 4.

Also, in this case, it is possible to start the operation of the camera unit 4 to be newly used and stop the operation of the original camera unit 4 to be replaced at the time of block G9 (or NO in block G5).

As described above, the information processing apparatus 1 of the present embodiment includes the two camera units 4 and the handwriting support utility program 110 adequately selects an image used for recognition of the pen 3 from the two images photographed by the two camera units 4 to increase the recognition precision.

In this case, an example of selecting an image used for recognition of the pen 3 from the two images photographed by the two camera units 4 is shown. However, if the number of simultaneous inputs is larger than or equal to two and the recognition ranges are overlapped, an image used for recognition of one of the pens 3 and an image used for recognition of the other pen 3 may be separately used for the two images photographed by the two camera units 4, respectively.

For example, when the two camera units 4 are disposed as shown in "A" of FIG. 14, the handwriting support utility program 110 separately uses two images photographed by the two camera units 4 based on coordinate information in a Y-axis direction of positional information included in input information output from the MCU 62 of the touch panel 6. Further, for example, when the two camera units 4 are disposed as shown in "B" of FIG. 14, the handwriting support utility program 110 separately uses two images photographed by the two camera units 4 based on coordinate information in an X-axis direction of the positional information included in the input information output from the MCU 62 of the touch panel 6.

As a result, the recognition precision can be further increased.

As described above, according to the present information processing apparatus, a mechanism that reduces a time lag from writing to displaying of written content, automatically makes recovery from erroneous recognition and maintains the recognition precision at a predetermined level even at the time of plural simultaneous inputs can be provided.

Since the operation control process of this embodiment can be realized by use of software (program), the same effect as that of the present embodiment can be easily attained by installing the software in a normal computer and executing the software via a computer-readable storage medium that stores the software.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An information processing apparatus comprising:
a display with a touch panel;
a recognition controller to recognize a type of an object used for inputting to the touch panel; and
a display controller to display a locus tracing from a start of the inputting to a termination of the inputting on the display, the display controller adding an attribute corresponding to the type of the object recognized by the recognition controller to the locus displayed on the display, the attribute comprising at least one of a color, size, shape and transparency,
wherein the display controller adds a first attribute to the locus in a period from the start of the inputting to recognition of the type of the object, and changes the first attribute to a second attribute corresponding to the type of the object when the type of the object is recognized.
2. The apparatus of claim 1, wherein: the image recognition controller is configured to execute the recognition for recognizing the type of the object at predetermined intervals in a period from time when the inputting is started to time when the inputting is terminated; and the display controller is configured to adaptively execute updating for updating the locus displayed on the display such that the locus displayed on the display is added the attribute corresponding to the type of the object that is most often recognized until then.

3. The apparatus of claim 1, wherein the recognition controller:
- starts the recognition for recognizing the type of the object when the inputting is started;
- executes the recognition for recognizing the type of the object at first intervals; and
- terminates the recognition for recognizing the type of the object when the type of the object is recognized.

4. A computer-readable, non-transitory storage medium having stored thereon a computer program which is executable by a computer, the computer program causing the computer to function as:
- a recognition controller to recognize a type of an object used for inputting to a touch panel on a display; and
- a display controller to display a locus tracing from a start of the inputting to a termination of the inputting on the display, the display controller adding an attribute corresponding to the type of the object recognized by the image recognition controller to the locus displayed on the display, the attribute comprising at least one of a color, size, shape and transparency.

5. The storage medium of claim 4, wherein: the image recognition controller is configured to execute the recognition for recognizing the type of the object at predetermined intervals in a period from time when the inputting is started to time when the inputting is terminated; and the display controller is configured to adaptively execute updating for updating the locus displayed on the display such that the locus displayed on the display is added the attribute corresponding to the type of the object that is most often recognized until then.

6. The storage medium of claim 4, wherein the recognition controller:
- starts the recognition for recognizing the type of the object when the inputting is started;
- executes the recognition for recognizing the type of the object at first intervals; and
- terminates the recognition for recognizing the type of the object when the type of the object is recognized.

* * * * *